United States Patent
Hallstein et al.

(10) Patent No.: US 8,358,410 B2
(45) Date of Patent: Jan. 22, 2013

(54) LARGE FIELD OF VIEW, HIGH NUMERICAL APERTURE COMPOUND OBJECTIVE LENS WITH TWO PAIRS OF IDENTICAL ELEMENTS AND NEAR IR SPECTROMETER CONTAINING TWO SUCH COMPOUND LENSES

(75) Inventors: Sascha Hallstein, Los Gatos, CA (US); Donald A. Ice, Milpitas, CA (US)

(73) Assignee: C8 Medisensors Inc., San Jose, CA (US)

( * ) Notice: Subject to any disclaimer, the term of this patent is extended or adjusted under 35 U.S.C. 154(b) by 305 days.

(21) Appl. No.: 12/785,049

(22) Filed: May 21, 2010

(65) Prior Publication Data

US 2010/0296090 A1  Nov. 25, 2010

Related U.S. Application Data (60) Provisional application No. 61/180,684, filed on May 22, 2009.

(51) Int. Cl.
*G01J 3/28* (2006.01)

(52) U.S. Cl. .................. 356/328; 359/771

(58) Field of Classification Search .......... 356/328; 359/355–357, 362, 644, 650, 660, 715, 734, 359/747, 753, 771–783
See application file for complete search history.

(56) References Cited

U.S. PATENT DOCUMENTS

| | | | | |
|---|---|---|---|---|
| 2,516,724 A * | 7/1950 | Rossinov | ...................... | 359/782 |
| 3,263,562 A * | 8/1966 | Lowenthal | .................... | 359/775 |
| 3,370,904 A * | 2/1968 | Hudson | ......................... | 359/775 |
| 3,507,560 A * | 4/1970 | Baker | ............................ | 359/753 |
| 3,731,990 A * | 5/1973 | Van Orden | .................... | 359/732 |
| 3,922,071 A * | 11/1975 | Kitagawa et al. | ............. | 359/756 |
| 3,994,576 A | 11/1976 | Glatzel et al. | | |
| 4,101,201 A | 7/1978 | Tojyo et al. | | |
| 4,105,291 A | 8/1978 | Tsuji | | |
| 4,123,144 A | 10/1978 | Mandler et al. | | |
| 4,556,295 A | 12/1985 | Okudaira et al. | | |
| 4,561,730 A * | 12/1985 | Lawson et al. | ................. | 359/715 |
| 4,726,669 A | 2/1988 | Angenieux | | |
| 5,000,548 A | 3/1991 | Mercado | | |
| 5,015,079 A * | 5/1991 | Minefuji | ....................... | 359/775 |
| 5,216,548 A | 6/1993 | Kung | | |
| 5,321,718 A | 6/1994 | Waarts et al. | | |
| 5,671,094 A * | 9/1997 | Yamakawa | .................... | 359/679 |
| 6,069,750 A | 5/2000 | Koizumi et al. | | |
| 6,208,474 B1 * | 3/2001 | Kondo | ........................... | 359/775 |
| 6,269,203 B1 | 7/2001 | Davies et al. | | |
| 6,950,241 B1 * | 9/2005 | Liang | ............................ | 359/660 |
| 2002/0054725 A1 | 5/2002 | Ivtsenkov et al. | | |
| 2003/0197911 A1 | 10/2003 | Huang | | |
| 2004/0151755 A1 | 8/2004 | Rathorne et al. | | |
| 2005/0018289 A1 | 1/2005 | Yanowitz | | |
| 2006/0152823 A1 | 7/2006 | Sauter et al. | | |
| 2008/0089598 A1 | 4/2008 | George et al. | | |

OTHER PUBLICATIONS

PCT International Search Report and Written Opinion, PCT Application No. PCT/US2010/035848, Jul. 26, 2010, 5 pages.

\* cited by examiner

*Primary Examiner* — Kara E Geisel (74) *Attorney, Agent, or Firm* — Fenwick & West LLP (57) ABSTRACT

An apparatus consisting of two pairs of identical lenses which is suitable as a compound objective lens for high numerical aperture imaging is disclosed. The compound lens also has a wide field of view as a fraction of the compound lens focal length. By suitable choice of lens materials, well corrected near infrared imaging can be achieved. When two such compound lenses together with a diffraction grating are assembled into a spectrometer, excellent wavelength resolution in the near infrared can also be obtained.

14 Claims, 7 Drawing Sheets

LARGE FIELD OF VIEW, HIGH NUMERICAL APERTURE COMPOUND OBJECTIVE LENS WITH TWO PAIRS OF IDENTICAL ELEMENTS AND NEAR IR SPECTROMETER CONTAINING TWO SUCH COMPOUND LENSES

CROSS-REFERENCE TO RELATED APPLICATION

This application claims priority under 35 U.S.C. §119(e) to U.S. Provisional Patent Application Ser. No. 61/180,684, filed May 22, 2009, entitled "Large Field Of View, High Numerical Aperture Compound Objective Lens With Two Pairs Of Identical Elements And Near IR Spectrometer Containing Two Such Compound Lenses," which is incorporated herein by reference in its entirety.

BACKGROUND OF THE INVENTION

1. The Field of the Invention

This invention relates to a compound objective lens suitable for imaging objects of substantial radial dimension, at high numerical aperture where each of the lens elements is re-used such that only two distinct elements are employed in the objective. The compound lens is particularly well suited as an objective lens for a near infrared spectrometer, and a well optimized design for such a spectrometer is presented.

2. Background and Relevant Art

Compound objective lenses suitable for imaging objects of substantial radial extent with reference to the focal length of the lenses have been demonstrated in various imaging applications. In U.S. Pat. No. 3,994,576, Glatzel et al. discloses a five element objective lens system of the expanded Tessar type wherein two of the elements are cemented to each other. Similarly in U.S. Pat. No. 4,101,201, Tojyo et al. discloses a low magnification microscope objective comprising two components of four elements. Further in U.S. Pat. No. 4,105,291, Tsuji et al. discloses a large aperture zoom lens comprising four groups of elements, each group consisting of two or more distinct lenses. Additionally, in U.S. Pat. No. 4,123,144, Mandler et al. discloses a four member Gauss objective with a net of six distinct elements. In U.S. Pat. No. 4,556,295 Okudaira et al. discloses a telephoto lens comprising ten or eleven distinct elements. Similarly, in U.S. Pat. No. 4,726,669, Angenieux discloses a high numerical aperture objective lens with compound focusing comprising four components, some of which consist of multiple lens elements. Mercado in U.S. Pat. No. 5,000,548 discloses a microscope objective with four distinct lens elements, whereas, Kung, in U.S. Pat. No. 5,216,548, discloses a compound lens with four elements for photographing printed objects of large extent. Finally, Koizumi et al. in U.S. Pat. No. 6,069,750 discloses a widefield eye-piece comprising four lens groups and containing five distinct elements.

A common feature of all the aforementioned disclosures is the multiplicity of distinct lens elements. The minimum number for all the disclosed designs is four. A review of all the designs also shows that when:

a. the object to be imaged has radial extent of greater than 0.25 of the focal length of the compound lens,
b. and when the numerical aperture exceeds 0.25,
c. and when the required resolution is less than about 0.01 of the focal length, that the complexity and number of distinct elements in the compound lens increases.

The cost of a compound lens will scale with the number of components. Also, when molding technology is used to form the lenses, a distinct mold is required for each element. Mold costs for precision optics can also be prohibitive so it is desirable to create the minimum number consistent with obtaining the required optical performance.

Double Gauss lenses have been employed in imaging applications, an example of which is disclosed in Mandler. In its general form it consists of positive meniscus lenses on the outside and negative meniscus lenses on the inside and may have additional elements. In some double Gauss arrangements lens elements are duplicated or nearly duplicated to obtain some aberration cancellation due to symmetry. It has not, however, heretofore been possible to obtain high resolution, high numerical aperture imaging with large field of view with double Gauss arrangements having less than four distinct elements.

SUMMARY

These and other limitations are addressed by the present invention, which discloses a compound lens comprising only two distinct lens elements, each of which is used twice. It is found that it is possible to achieve a numerical aperture of at least 0.3 and a total field of view of at least 4 mm for a lens focal length of 12 mm. When one such lens is used as a collimator, and a second identical lens is used for focusing to an image, it is found that the modulation transfer function for the a field point 2 mm off axis remains above 0.5 for a spatial frequency of <50 $mm^{-1}$.

The proposed arrangement has symmetric properties which are sometimes found in double Gauss lenses however the negative meniscus lenses are on the outside and the positive lenses are on the inside. Further the positive lenses are plano-convex aspheres, the presence of a planar surface introducing an additional useful simplification for fabrication.

A spectrometer can be formed by using one compound lens as a collimator, the output of which is diffracted by a diffraction grating, the diffracted light passing through a second compound lens for imaging. For radiation in the range 800-1000 nm, it is found to be advantageous to fabricate the negative meniscus lens from polystyrene and the positive lens from acrylic. The resultant spectrometer has satisfactory resolution across the wavelength range with an input slit height of about 4 mm.

DETAILED DESCRIPTION

Figure 1:
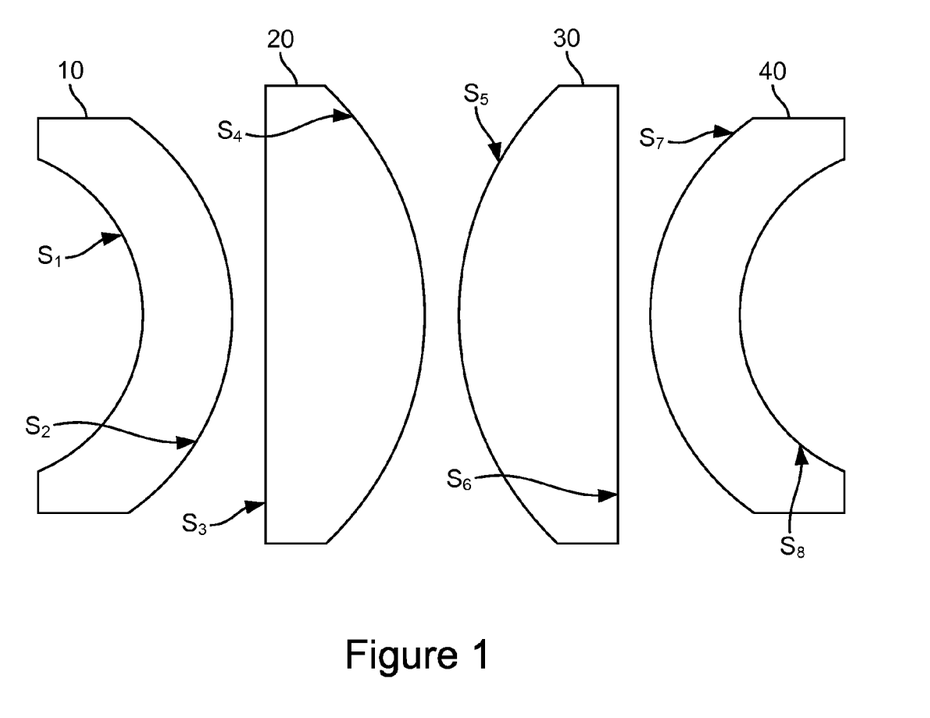
FIG. 1 is a cross-section drawing of a compound lens where two distinct lens elements have been duplicated to form an objective lens with four elements.

Referring to FIG. 1 the compound lens consists of four elements, 10, 20, 30 and 40 respectively. Lenses 10 and 40 are essentially identical to each other. Lenses 20 and 30 are essentially identical to each other. Each lens surface is characterized by a radius of curvature and a conic constant. The left-most surface of lens 20 and the right-most surface of lens 30 are substantially planar.

For imaging in the near infrared, lenses 10 and 40 are advantageously chosen to be fabricated from polystyrene whereas lenses 20 and 30 are chosen to be fabricated from acrylic. A representative example is presented wherein the focal length of the compound lens is about 12 mm. In FIG. 1, each surface is numbered from 1-8. In Table I. the properties of each surface are defined, where the curvature is in $mm^{-1}$, and the thickness and semi-diameter are in mm. Where a material is not specified, there is an air space present.

TABLE I

| Surface # | Curvature | Thickness | Material | Semi-Diameter | Conic |
|---|---|---|---|---|---|
| 1 | −0.18 | 2.50 | POLYSTYRENE | 5.20 | −0.25 |
| 2 | −0.12 | 1.00 | | 6.50 | −0.16 |
| 3 | 0.00 | 4.60 | ACRYLIC | 7.50 | 0.00 |
| 4 | −0.10 | 1.00 | | 7.50 | −0.64 |
| 5 | 0.10 | 4.60 | ACRYLIC | 7.50 | −0.64 |
| 6 | 0.00 | 1.00 | | 7.50 | 0.00 |
| 7 | 0.12 | 2.50 | POLYSTYRENE | 6.50 | −0.16 |
| 8 | 0.18 | 7.50 | | 5.20 | −0.25 |

Figure 2:
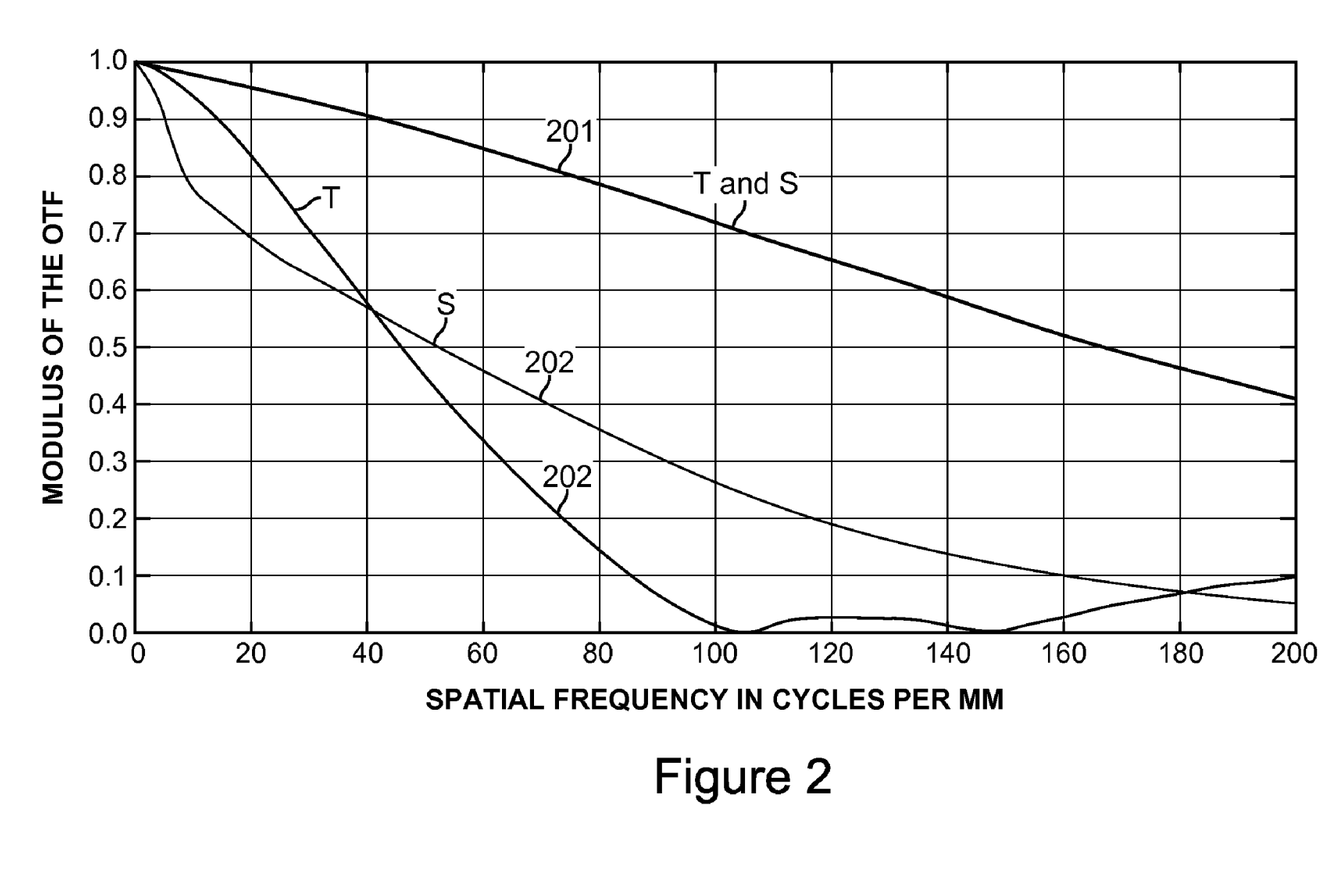
FIG. 2 shows the modulation transfer function versus spatial frequency for two compound lenses arranged back to back for field points on axis and 2 mm off axis, for a compound lens having a focal length of 12 mm.

The lens presented in FIG. 1 was designed to have a numerical aperture of at least 0.3 and total field of view of at least 4 mm. Two such lenses can be deployed back to back such that the first is a collimator whereas the second refocuses the collimated light to an image. The modulation transfer function of such an arrangement is presented in FIG. 2. The curves designated by T and S are the modulation transfer function for the tangential and sagittal rays respectively. Curves are presented for a field point on axis 201 and for a field point 2 mm off axis 202. The curves 201 overlap because for a symmetric system there is no distinction between the tangential and sagittal modulation transfer function for light originating on axis. The calculation was performed at a wavelength of 890 nm. It can be seen that for the on-axis radiation, the modulation transfer function is >0.5 for spatial frequencies <160 $mm^{-1}$. For a field point 2 mm off axis, the modulation transfer function is >0.5 for spatial frequencies <45 $mm^{-1}$, indicating good off-axis performance, hence, this compound lens has a good total field of view of at least 4 mm.

Figure 3:
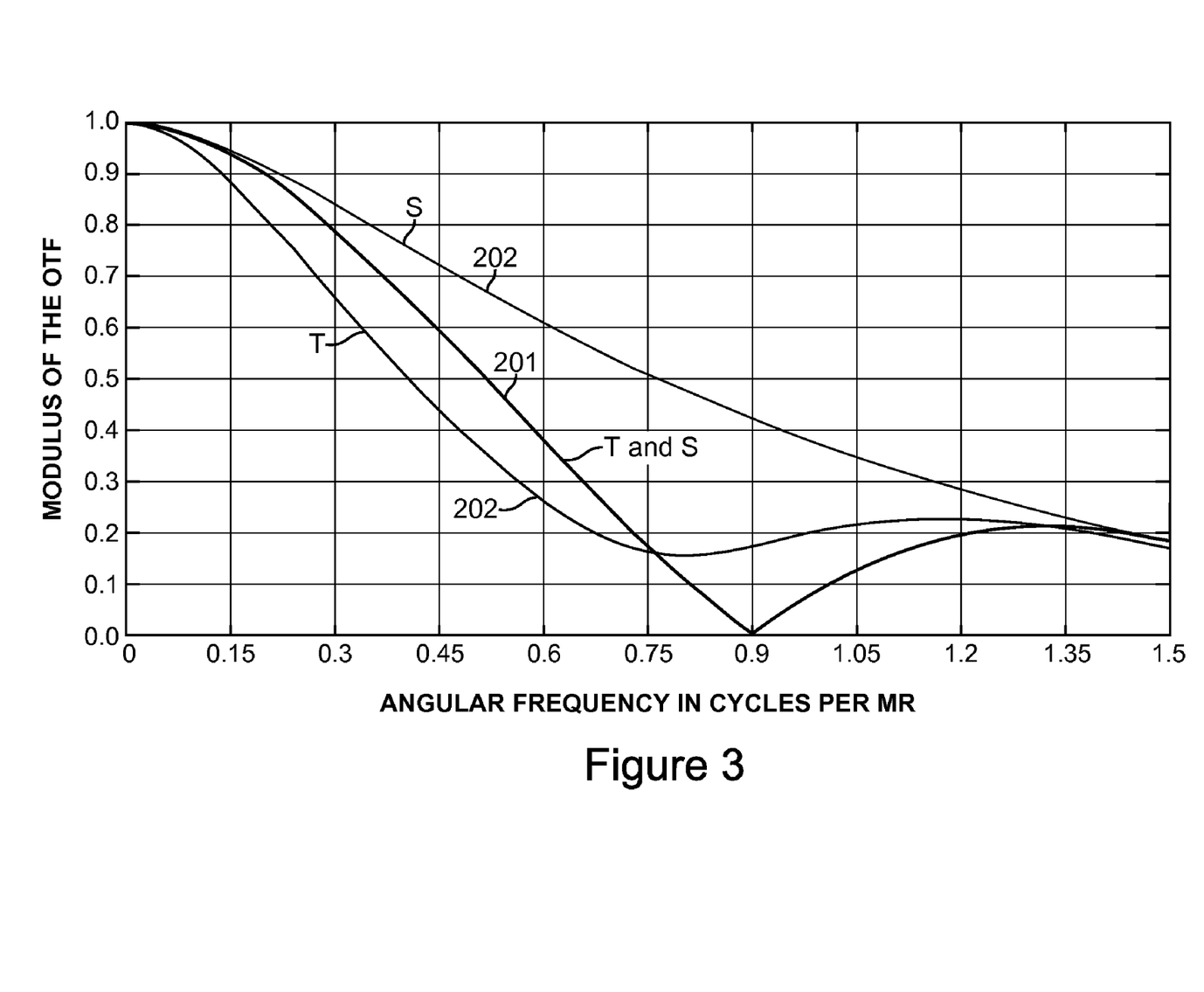
FIG. 3 shows the modulation transfer function in the angular domain for a single compound lens for field points on axis and 2 mm off axis, for a compound lens having a focal length of 12 mm.

The modulation transfer function of a single compound lens in the angular domain is presented FIG. 3 where the abscissa is in angular frequency per milliradian. It can be observed that the modulation transfer function is >0.5 for frequencies <0.4 cycles per milliradian. It should be recognized that designs different from the example which is provided but still within the framework of this invention may exhibit frequencies significantly less than 0.4 cycles per milliradian for the frequency at which the modulation transfer function is >0.5, for instance 0.3 cycles per milliradian. It is understood that the entire compound lens can be scaled uniformly and appreciably similar characteristics to the lens presented, consistently scaled, can be expected to be obtained.

The compound lens presented in FIG. 1 is readily distinguished from the prior art because it achieves all the following characteristics simultaneously with only two distinct elements which are duplicated:
 a. A numerical aperture in excess of 0.25.
 b. A total field of view which exceeds 0.25 of the focal length of the lens.
 c. The product of the spatial frequency at which the modulation transfer function exceeds 0.5, and the focal length of the lens exceeds 400, which is a measure of resolution.

Conventionally, lenses which obtained the aforementioned characteristics have had a least four distinct lens elements. When lenses are formed by molding, the cost of the mold may be high and it can be very advantageous to require a reduced number of distinct molds. Further, economies of scale are realized by producing a larger number of identical elements for the same number of compound lenses required.

Figure 4:
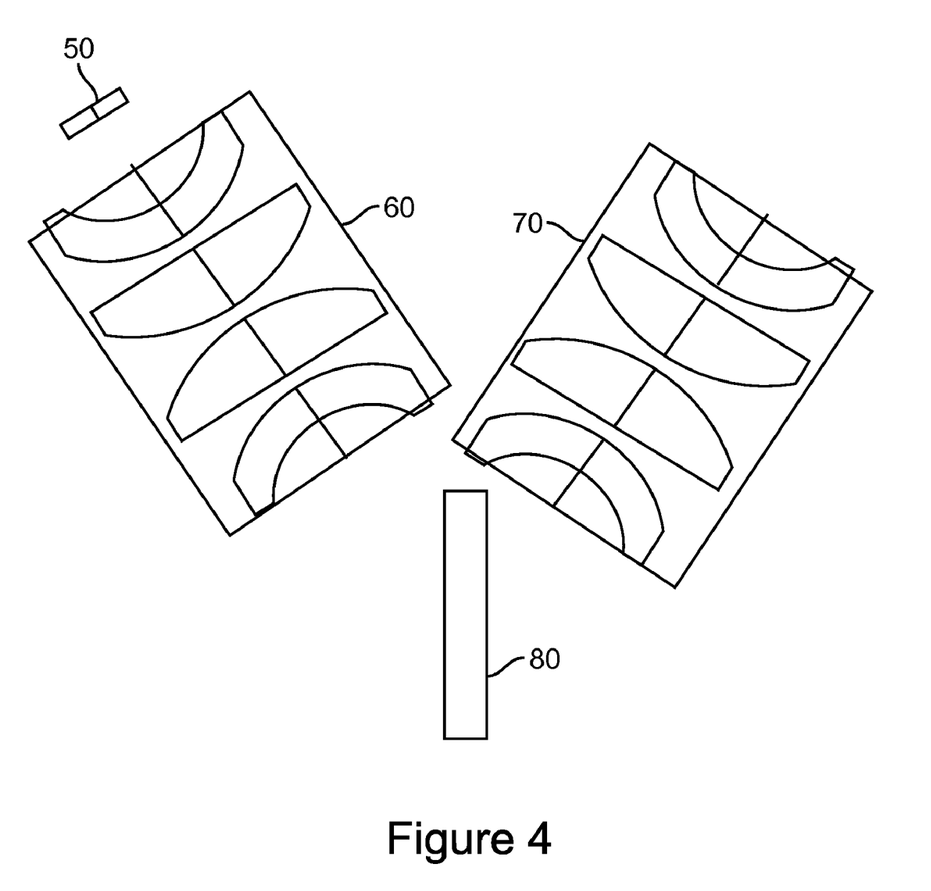
FIG. 4 shows a spectrometer formed from two compound lenses and a volume holographic diffraction grating.

Compensation of chromatic aberrations in the near infrared was achieved by choosing appropriate plastics for the two distinct lens elements and this gives rise to a particularly advantageous spectrometer design based on these lenses. The spectrometer design is presented in FIG. 4. Assemblies 60 and 70 are compound lenses of the same form as that in FIG. 1. Item 50 is an input slit and item 80 is a volume phase hologram. In this embodiment, the volume phase hologram has a line density of 1850 lines/mm. In other embodiments, the diffraction grating has a frequency of greater than 1000 $mm^{-1}$. The grating is deployed at an angle of 56° with respect to the optical axis of the input lenses. For compound lenses having a focal length of 12 mm, the nominal dispersion is 0.04 mm/nm. In this example, the range of wavelengths desired is 800 to 1000 nm. The total height of the input slit is 4 mm.

Figure 5A:
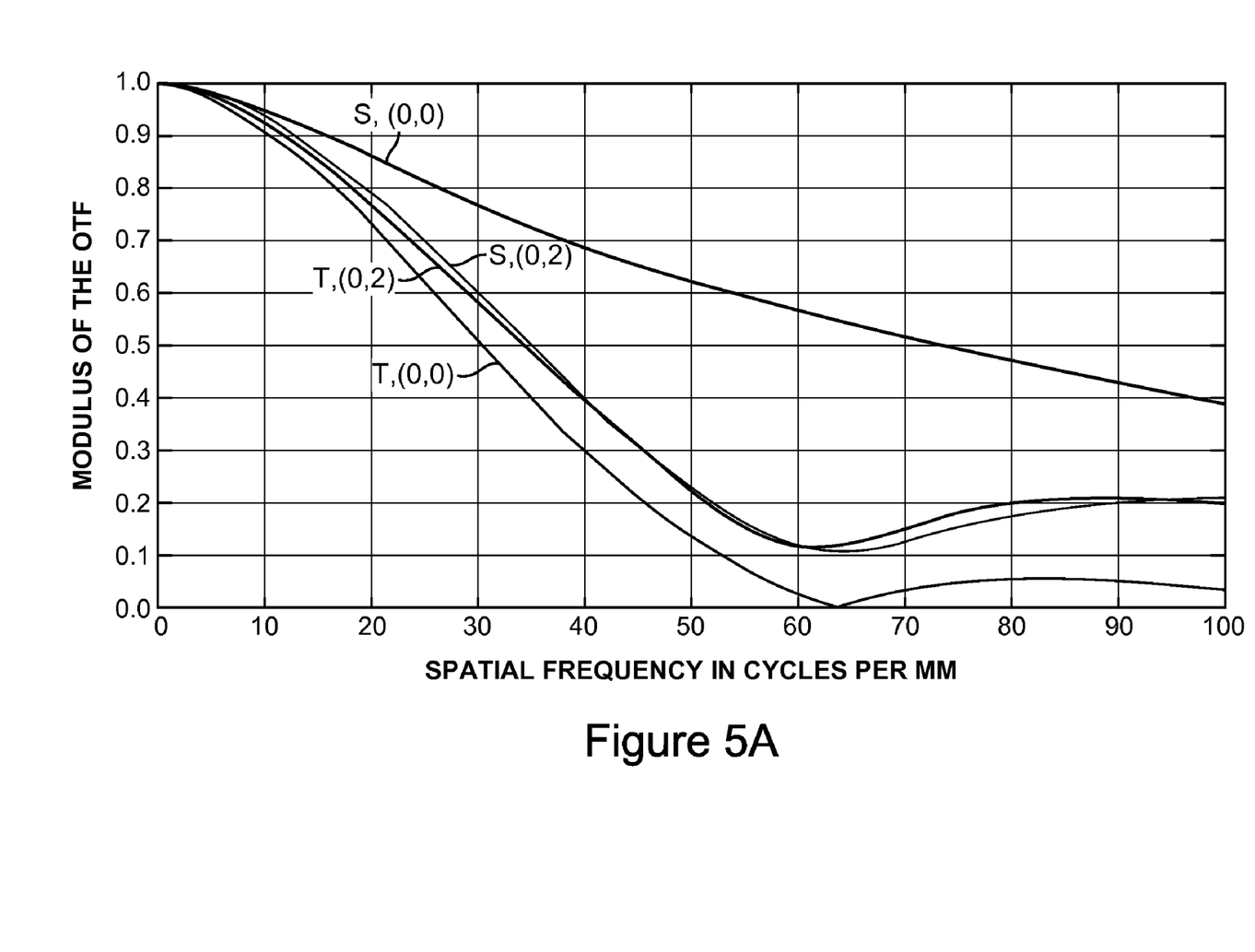
FIGS. 5A-C show the modulation transfer function in the tangential and sagittal directions for the spectrometer, for field points on axis and 2 mm off axis, at wavelengths of 850, 890 and 940 nm respectively.
Figure 5B:
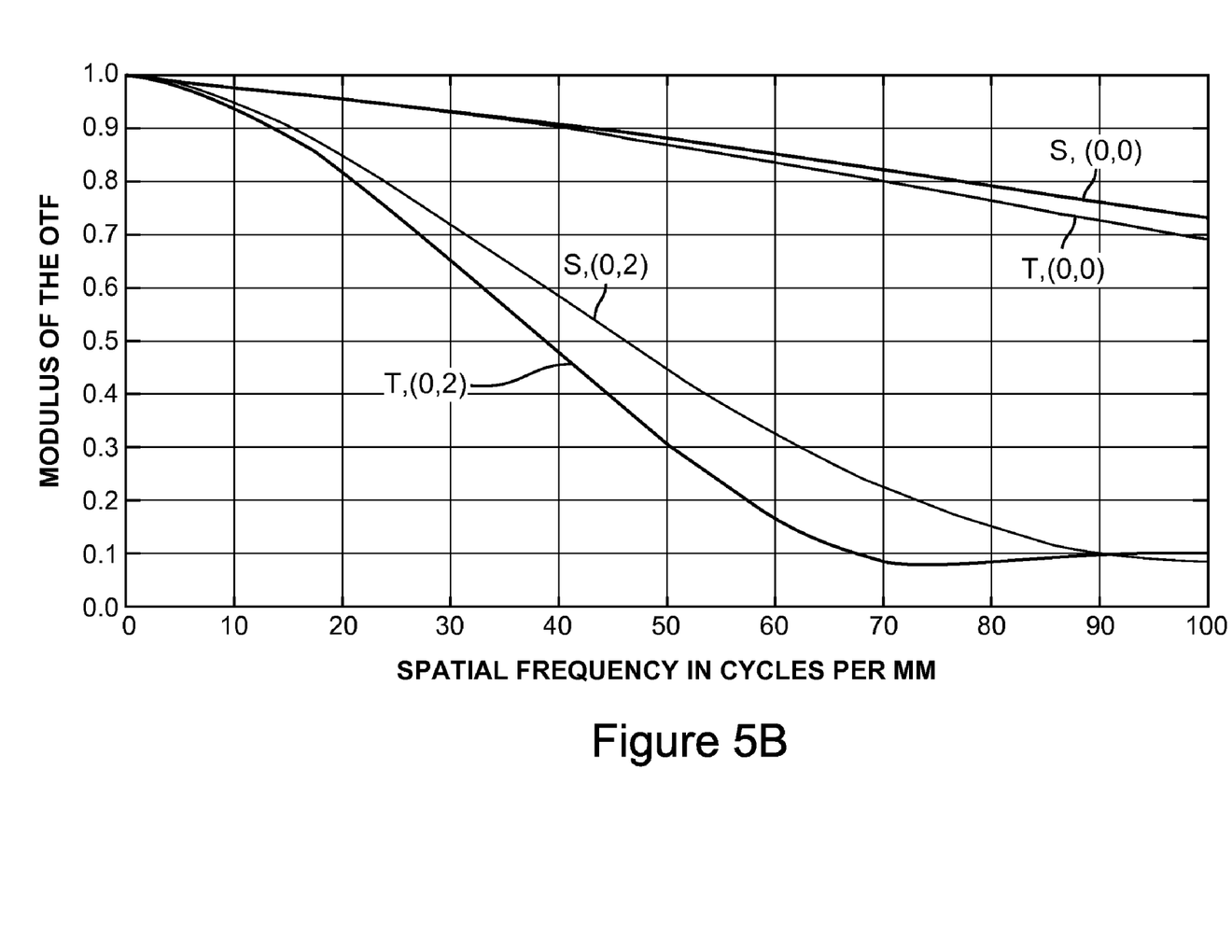
Figure 5C:
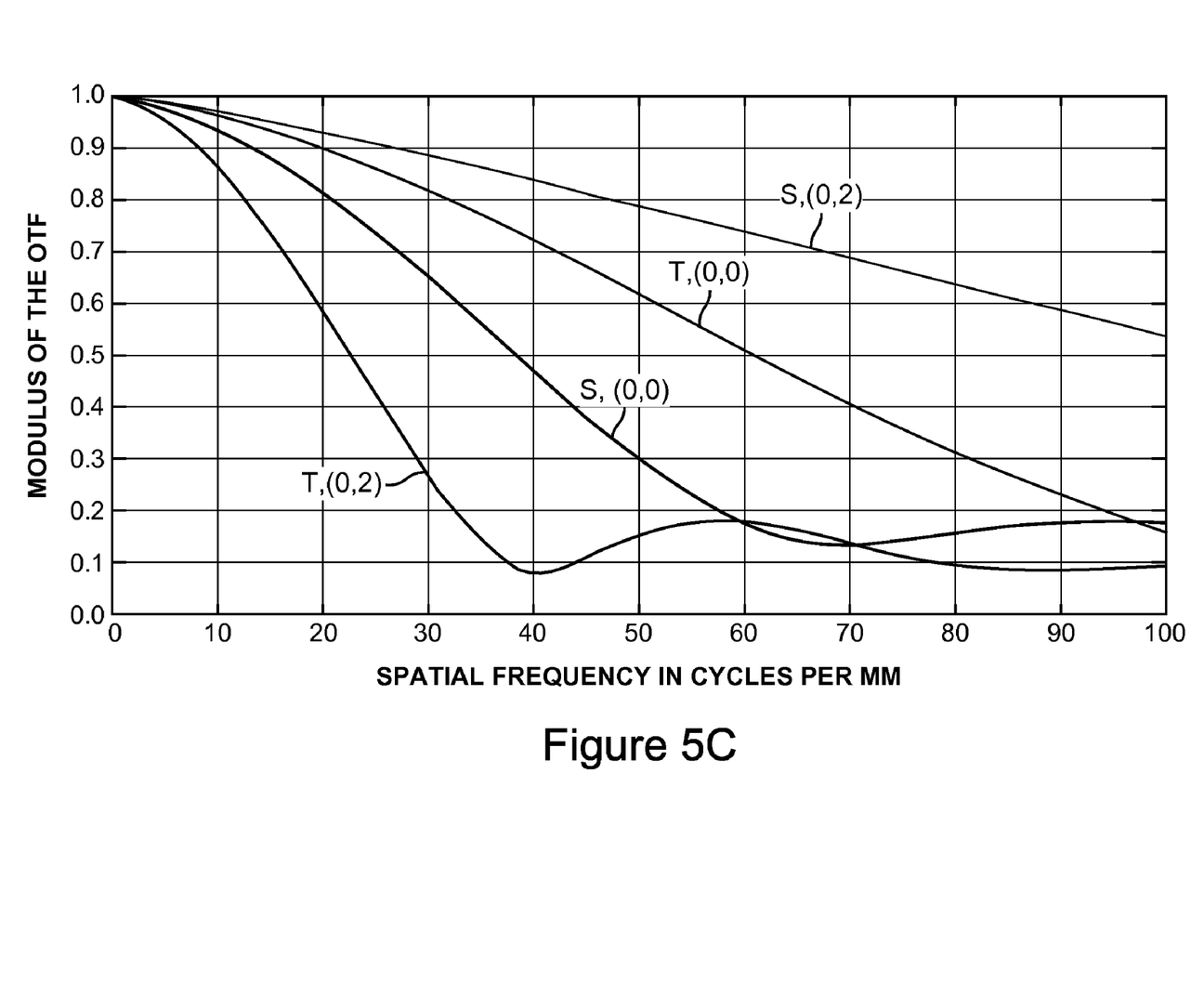

The modulation transfer function of the spectrometer can be calculated as a function of wavelength and of field position. As the slit height is 4 mm, the modulation transfer function is calculated at a field position of 2 mm off-axis and for a field position on-axis. The modulation transfer function versus spatial frequency for input wavelengths of 850, 890 and 940 nm respectively is presented in FIGS. 5A, B, and C. The tangential modulation transfer function is represented by the letter T and the sagittal transfer function by the letter S. The sagittal function directly affects the wavelength resolution of the spectrometer whereas the tangential function affects its spatial resolution, which is often less important. In FIGS. 5A-C, the coordinates of the field points for each curve are given adjacent to the designation of the transfer function as tangential or sagittal. The sagittal modulation transfer function is greater than 0.5 for all wavelengths at spatial frequencies less than 60 $mm^{-1}$, hence for input slit widths much greater than the 1/60 mm, the wavelength resolution of the instrument will not be significantly impaired. This performance was enabled, in part by the advantageous choice of lens materials.

Although the detailed description contains many specifics, these should not be construed as limiting the scope of the invention, but merely as illustrating different examples and aspects of the invention. It should be appreciated that the scope of the invention includes other embodiments not discussed in detail above. Various other modifications, changes and variations which will be apparent to those skilled in the art may be made in the arrangement, and details of the apparatus of the invention disclosed herein without departing from the spirit and scope of the invention.

The invention claimed is:
1. A compound lens comprising:
 exactly four lenses, wherein a shape of the first lens is essentially identical to a shape of the fourth lens, and a shape of the second lens is essentially identical to a shape of the third lens;
 wherein the compound lens has a numerical aperture greater than 0.25;
 wherein the compound lens has a field of view of at least 25% of the compound lens focal length; and wherein an angular frequency at which a modulation transfer function exceeds 0.5 is at least 0.3 cycles per milliradian.

2. The compound lens of claim 1, wherein the first and fourth lenses are polystyrene and the second and third lenses are acrylic.

3. The compound lens of claim 1, wherein one surface of the second lens and one surface of the third lens are nominally planar.

4. The compound lens of claim 1, wherein all non-planar surfaces are aspherical.

5. The compound lens of claim 1, wherein the first lens and fourth lens are meniscus lenses.

6. A spectrometer comprising:
a first compound lens comprising exactly four lenses, wherein a shape of the first lens is essentially identical to a shape of the fourth lens, and a shape of the second lens is essentially identical to a shape of the third lens;
a diffraction grating positioned to receive light from an optical input that passes through the first compound lens; and
a second compound lens comprising exactly four lenses, wherein a shape of the first lens is essentially identical to a shape of the fourth lens, and a shape of the second lens is essentially identical to a shape of the third lens, the second compound lens positioned to receive light diffracted from the diffraction grating,
wherein the first and second compound lenses have numerical apertures greater than 0.25;
wherein the first and second compound lenses have field of views of at least 25% of the compound lens focal length; and
wherein the first and second compound lenses comprise a measure of resolution defined by a product of a minimum spatial frequency at which a modulation transfer function exceeds 0.5 and the respective compound lens focal length exceeds 400, for everywhere in the respective compound lens field of view.

7. The spectrometer of claim 6, wherein the first and second compound lenses are essentially identical.

8. The spectrometer of claim 6, wherein the optical input has a wavelength of 800-1000 nm.

9. The spectrometer of claim 6, wherein the diffraction grating is a volume phase hologram.

10. The spectrometer of claim 6, where the diffraction grating has a frequency of greater than 1000 $mm^{-1}$.

11. The spectrometer of claim 6, wherein the first and fourth lenses of each of the first and second compound lenses are polystyrene, and the second and third lenses of each of the first and second compound lenses are acrylic.

12. The spectrometer of claim 6, wherein one surface of the second lens and one surface of the third lens of each of the first and second compound lenses are nominally planar.

13. The spectrometer of claim 6, wherein all non-planar surfaces are aspherical.

14. The spectrometer of claim 6, wherein the first lens and fourth lens of each of the first and second compound lenses are meniscus lenses.

* * * * *